(12) United States Patent
Dodd et al.

(10) Patent No.: US 6,530,006 B1
(45) Date of Patent: Mar. 4, 2003

(54) SYSTEM AND METHOD FOR PROVIDING RELIABLE TRANSMISSION IN A BUFFERED MEMORY SYSTEM

(75) Inventors: James M. Dodd, Shingle Springs, CA (US); Michael W. Williams, Citru Heights, CA (US); John Halbert, Beaverton, OR (US); Randy M. Bonella, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 199 days.

(21) Appl. No.: 09/664,982

(22) Filed: Sep. 18, 2000

(51) Int. Cl.[7] ............................................. G06F 12/00
(52) U.S. Cl. .......................... 711/167; 711/105; 710/52
(58) Field of Search ................................. 711/117, 167, 711/105; 710/52

(56) References Cited

U.S. PATENT DOCUMENTS

| | | | | |
|---|---|---|---|---|
| 5,926,046 A | * | 7/1999 | Uchida | 327/149 |
| 5,964,880 A | * | 10/1999 | Liu et al. | 713/401 |
| 6,014,042 A | | 1/2000 | Nguyen | |
| 6,016,282 A | | 1/2000 | Keeth | |
| 6,047,346 A | | 4/2000 | Lau et al. | |
| 6,125,157 A | | 9/2000 | Donnelly et al. | |
| 6,128,025 A | * | 10/2000 | Bright et al. | 345/504 |
| 6,185,644 B1 | | 2/2001 | Farmwald et al. | |
| 6,295,593 B1 | * | 9/2001 | Hsu et al. | 711/169 |
| 6,333,959 B1 | * | 12/2001 | Lai et al. | 377/69 |

FOREIGN PATENT DOCUMENTS

| | | |
|---|---|---|
| EP | 1 020 864 | 5/1996 |
| WO | WO 99/00734 | 7/1999 |
| WO | PCT/US 01/28930 | 9/2001 |

* cited by examiner

*Primary Examiner*—Hiep T. Nguyen
(74) *Attorney, Agent, or Firm*—Pillsbury Winthrop LLP

(57) ABSTRACT

The present invention provides a system and method for providing reliable transmission in a buffered memory system. The system includes memory devices, a memory controller, data buffers, an address/command buffer, and a clock circuit. The memory controller sends data, address information, status information and command information, to the memory devices and receives data from the memory devices. The buffers interconnect the memory devices and the memory controller. The clock circuit is embedded in the addr/cmd buffer. The clock circuit takes an input clock and outputs an output clock to the data buffers and/or the memory devices to control clock-skew to the data buffers and/or the memory devices.

19 Claims, 6 Drawing Sheets

SYSTEM AND METHOD FOR PROVIDING RELIABLE TRANSMISSION IN A BUFFERED MEMORY SYSTEM

BACKGROUND OF THE INVENTION

1. Field of the Invention

The present invention generally relates to a memory system that utilizes a buffering structure to isolate a memory controller from memory devices, and in particular, to a system and method for providing reliable transmission of information—such as data, status, command, and address—in a buffered memory system. The memory devices may, for example, be dynamic random access memory (DRAM) devices.

2. Related Art

A typical memory system includes a memory controller and memory devices, such as DRAMs, coupled thereto. In some systems, a processor performs memory controller functions. As used herein, the term memory controller includes such a processor. The memory controller and memory devices are coupled together using a memory interface. The memory interface provides communication between the memory controller and the memory devices. The memory interface may contain address bus lines, command signal lines, and data bus lines. Increasing demand for higher computer performance and capacity has resulted in a demand for a larger and faster memory. However, as operating speed and the number of memory modules connected to the chipset increase, the resultant increased capacitive loading may place substantial limits on the size and speed of the memory.

A drawback to memory devices directly connected to a memory bus is that there is no voltage level isolation between the memory devices and the memory controller and no capacitive load isolation between the memory bus and the memory devices. As such, it is required that each component operates with the same interface voltage and frequency. Therefore, the memory controller is manufactured to operate with specific memory devices meeting these parameters. Conversely, the memory devices are also utilized only with a memory controller having the same interface voltage and operating frequency. Therefore, the memory devices utilized with memory controllers are limited to only those having the same interface voltage and operating frequency as that of the memory controller.

Moreover, as the frequency of signals travelling through the memory increases, inherent delays between an external, system or reference clock and the time data is valid for either the memory controller or the memory devices becomes a crucial constraint. The time data is valid for the memory controller is important when the memory controller is expecting data from the memory device, such is in a read operation. The time data is valid for the memory devices is important when the memory devices are expecting data from the memory controller, such as in a write operation. The delay can be large enough to make a following clock cycle overlap the data. That is, the delay becomes large enough for data not to be ready for the memory controller or the memory device during one cycle, and it essentially becomes "off-sync".

In other memory system, solutions have evolved to solve the "off-sync" difficulties. Prior art designs, such as a registered dual in line memory module ("registered DIMM") system, have addressed the difficulties by utilizing a discrete phase lock loop chip. The input clock to the registered DIMM module enters the discrete chip, the output of which is used to drive registers in the registered DIMM system. However, memory controller and memory devices within a registered DIMM system are constrainted to have the same interface voltage and operating frequency. The cost requiring specifically designed memory devices to match the memory controller in a registered DIMM system, and vice versa, creates high development expenses, as well as limiting the interchangeability of various existing memory components. Therefore, there is a need for a system and method to provide a memory system that would not only provide reliable transmission and reduce clock-insertion and propagation delay, but also would not require each component to operate with the same interface voltage and frequency.

DETAILED DESCRIPTION

Figure 1:
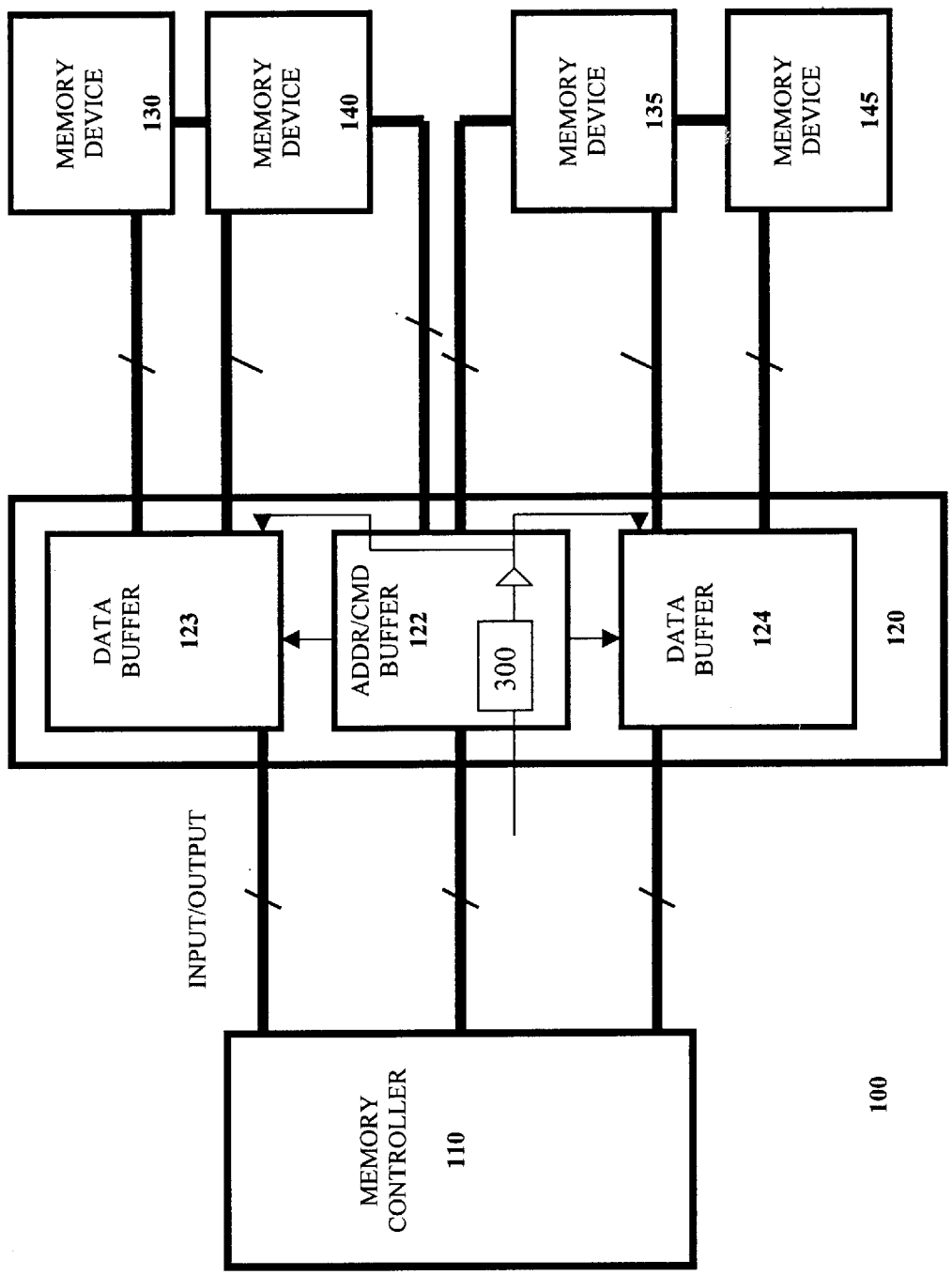
FIG. 1 illustrates a diagram of a buffered memory system according to an embodiment of the present invention.

Embodiments of the present invention are directed to a system and method for providing reliable transmission of information—such as data, status, command, and address—in a buffered memory system. FIG. 1 illustrates a diagram of a buffered memory system according to an embodiment of the present invention. The buffered memory system 100 comprises a memory controller 110, a buffer 120, an embedded clock circuit 300, and memory devices 130–145. The buffer 120 is an external buffer(s) or register(s) that has the functionality of reducing the impedance seen by the memory controller 110. The memory controller 110 is coupled to the buffer 120, which is further coupled to the memory devices 130–145, such as DRAM devices. By placing the buffer 120 in between the memory controller 110 and memory devices 130–145, transfer of data and information between the memory controller 110 and memory devices 130–145 is facilitated. The electrical characteristics of the memory system 100 are also improved and bolder scaling is allowed. Although the connection lines are represented as a single line to the buffer 120, and to the memory devices 130–145, each represented line may in fact be a plurality of lines. The memory controller 110 may, for example, be a chipset central processing unit, and it is adapted to transmit different information—e.g., data, status information, address information, command information—to the memory devices 130–145 via the buffer 120. The memory controller 110 is further adapted to receive data from the memory devices 130–145 via the buffer 120.

In this embodiment, the buffer 120 comprises a number of specialized buffers or registers: data buffers 123, 124 for buffering data; and address and command buffer 122 (ADDR/CMD buffer) for buffering address information and command information transmitted from the memory controller 110 and/or status information transmitted from the memory devices 130–145. Within the ADDR/CMD buffer 122, there is embedded therein the clock circuit 300. The ADDR/CMD buffer 122 receives an input clock or strobe, which is applied to the embedded clock circuit 300 From the embedded clock circuit 300, an output clock is supplied to the data buffers 123, 124. The embedded clock circuit 300 is implemented so that reliable transmission is provided in the buffered memory system. In particular, the clocking of data buffers 123, 124 is synchronized with that of the ADDR/CMD buffer 122. With the combination of placing the buffer 120 in between the memory controller 110 and memory devices 130–145 and embedding the clock circuit 300 in the ADDR/CMD buffer 122, the electrical characteristics of the memory system 100 is improved while reliable transmission is provided.

Figure 2:
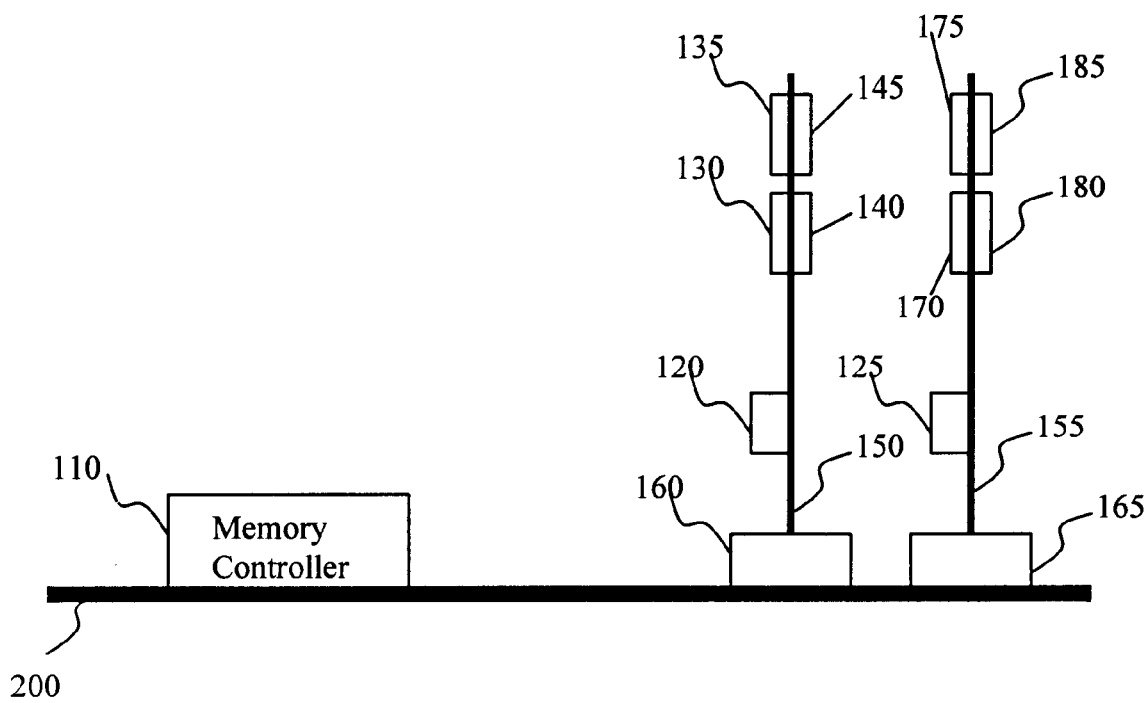
FIG. 2 shows an illustrative example of a buffered memory system in which embodiments of the present invention may function.

FIG. 2 shows an illustrative example of a buffered memory system in which embodiments of the present invention may function. In this example, the memory controller 110 resides on a motherboard 200. The memory devices 130–145, 170–185 resides on memory modules 150, 155. The memory modules 150, 155 are connected to the motherboard 200 through connectors 160, 165. The memory devices 130–145 reside on the first memory module 150, while the memory devices 170–185 reside on the second memory module 155. In other embodiments, the configuration of the memory devices 130–145, 170–185 on the memory modules 150, 155 may be different, and the memory controller 110 may control more or fewer memory devices than those shown in FIG. 2.

In this embodiment, the buffers 120 and 125 reside on the memory modules 150 and 155, respectively, creating buffered modules in which a clock circuit is embedded therein to provide reliable transmission in the buffered memory system. However, the buffers 120, 125, and the individual elements of the buffers 120, 125 such as data buffers 123, 124 and ADDR/CMD buffer 122, are not limited to the placement shown in FIG. 2. That is, they are not limited to placement on a memory module. The buffering of data and command/address may also be performed on the motherboard device 200 or on external (discrete) buffers. In one embodiment, external (discrete) buffers are utilized to allow different voltages and frequencies to be used for the memory controller 110 and memory devices 130–145, 170–185.

Figure 3:
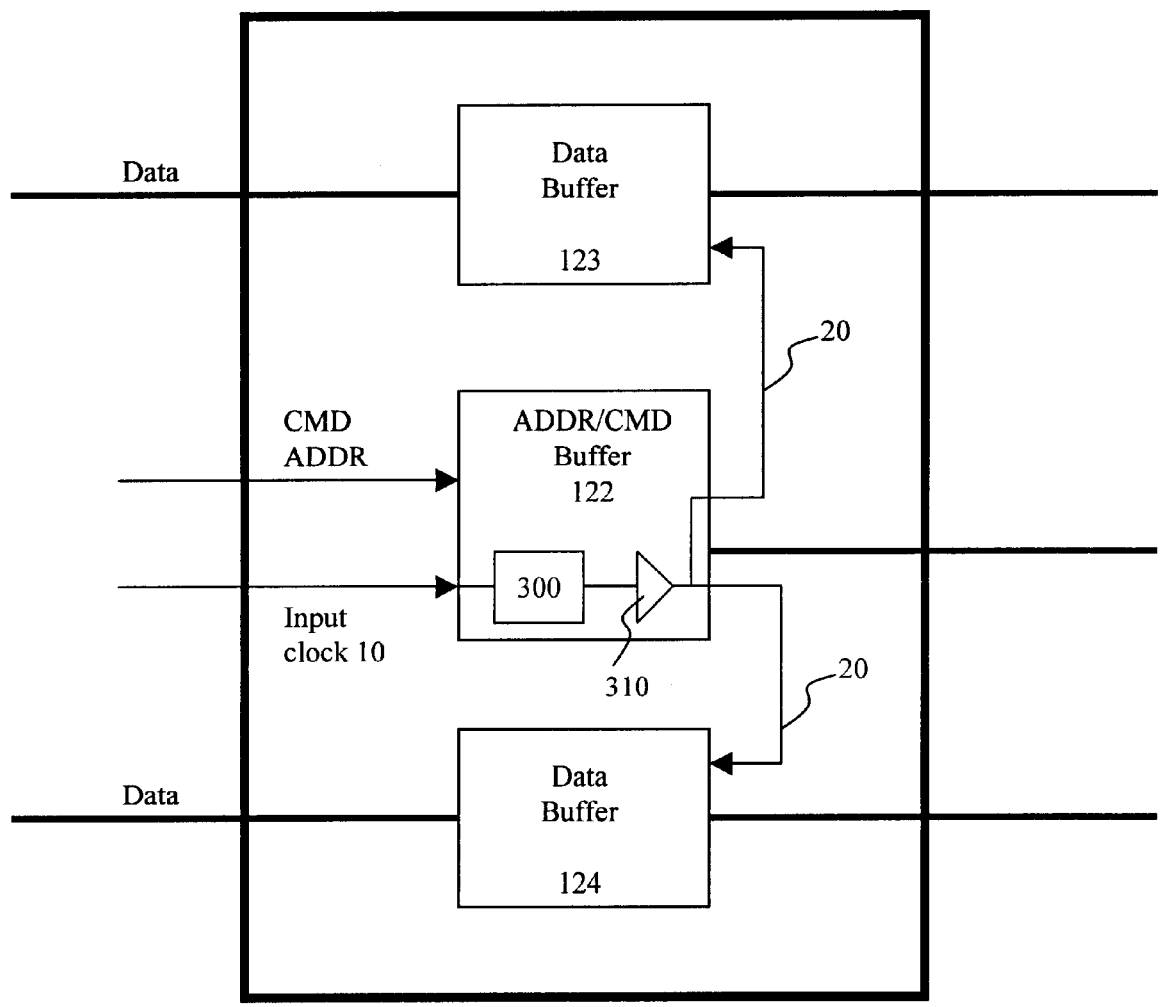
FIG. 3 depicts a buffering structure including an embedded clock circuit according to an embodiment of the present invention.

Clocking the data buffers 123, 124 and ADDR/CMD buffer 122 in the buffered memory system accurately without introducing error due to propagation delays may be implemented by embedding a clock circuit into the ADDR/CMD buffer 122 and having the clock circuit control clock-skew to the data buffers 123, 124. FIG. 3 depicts a buffering structure including an embedded clock circuit 300 according to an embodiment of the present invention. The buffering structure interconnects a memory controller and memory devices. In this embodiment, the buffering structure comprises two data buffers 123, 124 and an ADDR/CMD buffer 122. In other embodiments, the buffering structure may comprise more or fewer data buffers and/or ADDR/CMMD buffers. The data buffers 123, 124 are utilized to, among other things, facilitate data transfer between the memory controller and memory devices. The ADDR/CMD buffer 122 is utilized to, among other things, facilitate the transfer of command information and address information from the memory controller to the memory device. Embedded in the ADDR/CMD buffer 122 is an embedded clock circuit 300. An input clock 10 is applied to the ADDR/CMD buffer 122. The input clock 10 is either driven from the memory controller 110 or from an external source. The clock being driven by the memory controller 110 or the external source may, for example, be a base clock for a computer system containing the buffered memory system or a base clock for the memory controller 110. In the clock circuit 300, clock-skew, which is normally caused by the arrival of clock signals at the data buffers 123, 124 and the ADDR/CMD buffer 122 at meaningfully different times in a source-synchronous system, is eliminated. After the clock-skew is eliminated, an output clock 20 is output from the clock circuit 300. The clock circuit 300 controls the output clock 20 to have the same phase as the input clock 10. The clock circuit 300 is further coupled to a clock driver 310, which drives the output clock 20 to the data buffers 123, 124. Thus, the data buffers 123, 124 and the ADDR/CMD buffer 122 are clocked by clock signals with the same phase relationship, allowing memory devices to successfully receive the needed signals in one clock command.

Various methods may be utilized to implement the clock circuit 300. For example, a first illustrative method utilizes a delay locked loop (DLL). A second illustrative method utilizes a phase locked loop (PLL). A third illustrative method utilizes a delay chain. A DLL is well known in the art. The DLL in the ADDR/CMD buffer 122 basically receives the input clock 10 and shifts (i.e., time delays) the input clock in the ADDR/CMD buffer 122. The time delayed clock, the output clock 20, is fed to the data buffers 123, 124 as their input clocks. This allows the data buffers 123, 124 to be synchronized with the ADDR/CMD buffer 122. The data and the command and address information are re-timed, and the memory devices receive everything in one clock command. A common implementation of a DLL may include the following: a phase detector comprised of D-type flip-flop, cross-coupled NAND gates which form an RS flip-flop, AND gates, and a fixed delay circuit; a digital delay line which comprises a series of identical delay elements; a right/left shift register having one stage per delay element; internal clock input and output buffers. In operation, the DLL introduces more or fewer delay line elements in the delay line (which are connected in series) to control the timing of an output signal.

According to an embodiment of the present invention, a DLL is utilized in the clock circuit 300 to control clock-skew to the data buffers 123, 124 and to reduce clock-insertion and propagation delay. The DLL has an input signal and a feedback output signal. The DLL compares the delay between the two signals and digitally sets the delay chain to synchronize the two signals. There are a number of stages to the delay chain, and each stage may, for example, introduce ten picoseconds of delay. The phase difference between the output signal and the input signal is examined continuously, and adjustment is made to keep the proper delay. In the embodiment, the input signal of the DLL is the input clock 10, while the output signal of the DLL is the output clock 20. The DLL takes the input clock 10, which provides clocking to the ADDR/CMD buffer 122, and controls the phase of the output clock 20 generated from the input clock 10. The DLL thus controls the relative phase relationship of the output clock 20 and the input clock 10. In one implementation, the DLL artificially adds enough delay into the input of the DLL, i.e., input clock 10, to make the phase of the output of the DLL, i.e., output clock 20, be 360 degrees behind the input of the DLL. This way, the output clock 20 is back in alignment with the input clock 10. The output clock 20 is driven out to the data buffers 123, 124 and used as input clocks for the data buffers 123, 124. As a result, the clocks seen by the data buffers 123, 124 have the exact same phase relationship as the clock coming into the ADDW/CMD buffer 122. Without the DLL, clock-insertion and propagation delay would be added to the clock signal when it passes through the ADDR/CMD buffer 122, making the output clock out of phase.

Figure 4:
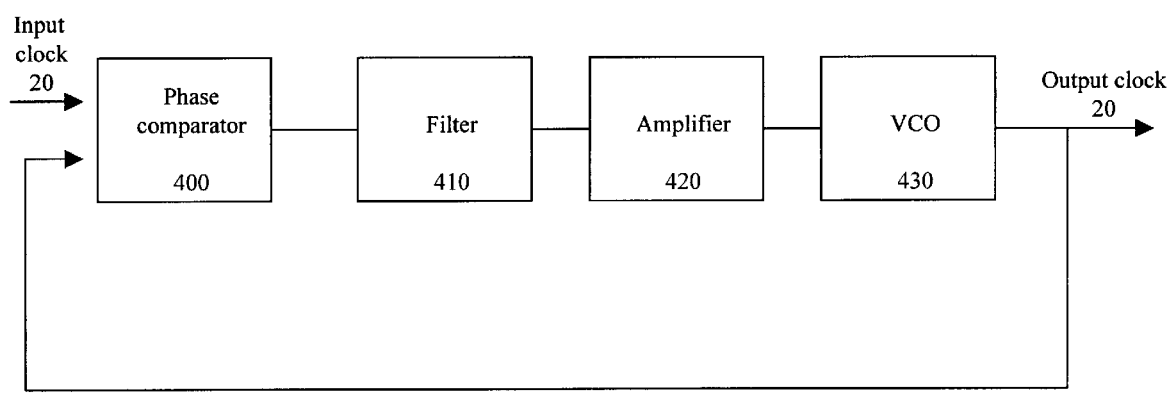
FIG. 4 shows an illustrative example of a phase locked loop of an embedded clock circuit according to an embodiment of the present invention.

According to another embodiment of the invention, a PLL is utilized to implement the clock circuit 300 for performing synchronization. A PLL is a closed loop frequency control system based on the phase sensitive detection of phase difference between an input signal to the PLL and the output signal of a voltage-controlled oscillator in the feedback loop of the PLL. The PLL gives the clock circuit 300 the ability to accurately control clock-skew to the data buffers and reduce clock-insertion and propagation delay. FIG. 4 shows an illustrative example of a phase locked loop of an embedded clock circuit according to an embodiment of the present invention. The PLL comprises a phase comparator 400, a low-pass filter 410, an amplifier 420, and a voltage-controller oscillator (VCO) 430. The VCO 430 is in a feedback loop. The PLL receives an input signal and provides an output signal. In the embodiment, the input signal is input clock 10 and the output signal is output clock 20. The phase comparator 400 compares the phase of the input clock 10 with the phase of the output of the VCO 430. If the two phases are different, the phase comparator 400 produces a phase error signal, which, after low-pass filtering by the low-pass filter 410 and amplification by the amplifier 420, is used to drive the VCO frequency in the direction of the input frequency. When the PLL is "locked," the frequency and phase of the output signal are the same as those of the input signal. If the phase of the input signal varies, the phase of the output signal follows.

The VCO 430 may, for example, be a ring-oscillator type or a multivibrator type. The phase comparator may, for example, be a set of balancing buffers and highly balanced D-type flip-flops. As compared to using a DLL, the advantages of using a PLL is that the PLL is more accurate. Instead of having delay elements in 10 or 50 picoseconds increments as in a DLL, the PLL has much better accuracy. However, in digital systems such as memories, a PLL having analog characteristics may introduce analog design complications in a mainly digital design. The PLL is a larger and more complicated circuit than the DLL, but it gives the clock circuit 300 finer control.

In other embodiments, instead of having a DLL or PLL in the embedded clock circuit, a delay chain is utilized to introduce a delay in a similar fashion as a DLL or PLL. Delay chains are well-known in the art. In one implementation, the delay is a compensated delay. The delay chain comprises a number of delay elements, each delay element having a fixed time period. Depending on the condition of the buffered memory system, the delay is adjusted by adjusting the number of in-circuit delay elements. The conditions of the buffered memory system that impact propagation of the signals is monitored continuously, and the delay adjusted accordingly.

Figure 5:
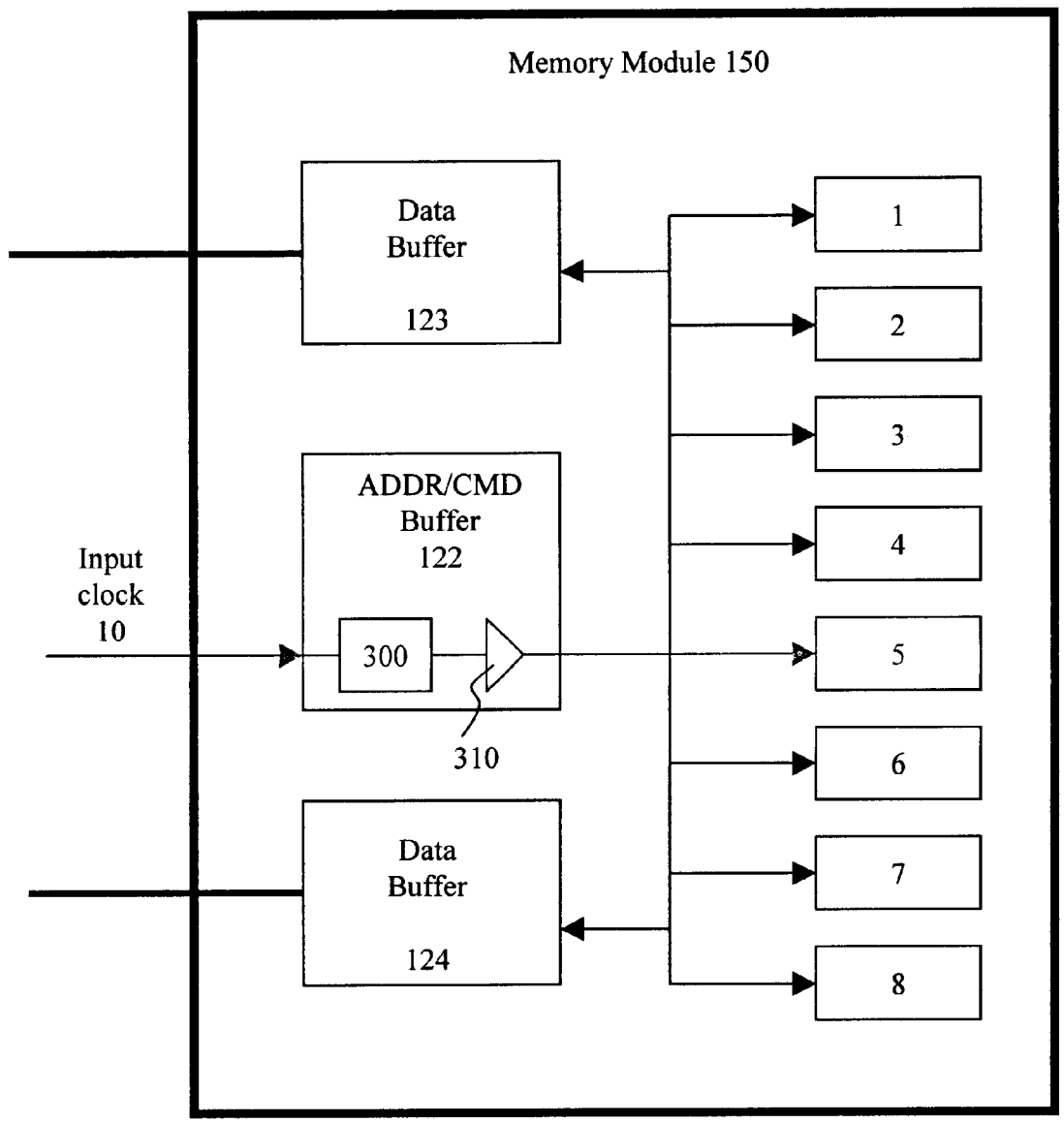
FIG. 5 depicts a buffered memory system according to an embodiment of the present invention.

FIG. 5 depicts a buffered memory according to another embodiment of the invention, wherein an ADDR/CMD buffer is used to drive the clocks to memory devices. In the embodiment, the buffering structure—including data buffers 123, 124 and an ADDR/CMD buffer 122—and the memory devices 1–8, such as DRAMs, are housed within a memory module 150. A memory controller is adapted to transmit information such as data, status information, address information and command information to the memory devices 1–8 via the buffering structure. The memory controller is further adapted to receive data from the memory devices 1–8 via the buffering structure. Within the ADDR/CMD buffer 122, there is embedded therein a clock circuit 300 and a clock driver 310. An input clock or strobe enters the ADDR/CMD buffer 122 and passes through the embedded clock circuit 300. The embedded clock circuit 300 then outputs an output clock to the data buffers 123, 124 and the memory devices 1–8. The embedded clock circuit 300 is implemented so that reliable transmission such as having the clocking of the data buffers 123, 124 and the memory devices 1–8 synchronized with that of the ADDR/CMD buffer 122 is provided.

In the embodiment, not only does the clock driver 310 drive the output clock 20 from the clock circuit 300 to the data buffers 123, 124, the clock driver 310 also drives the output clock 20 to the memory devices 1–8. The clock driver 310 is preferably comprised of several output clock drivers. In effect, the clock circuit buffers the clock into the module and provides multiple copies of the clock to the memory devices 1–8, improving clocking accuracy to the memory devices 1–8. The clock circuit 300 may, for example, be implemented by utilizing a PLL, a DLL, or a delay chain. In case of utilizing a PLL, a buffered PLL-controlled clock is provided to the memory devices 1–8, providing clocking integrity and avoiding clock-insertion delay. On the other hand, an alternative clocking scheme may be provided, wherein the clock circuit 300 sets different delay for clocks going to the memory devices 1–8 and clocks going to the data buffers 123, 124. For example, the clocks that the memory devices 1–8 see may be set to be 100 picoseconds later than the clocks that the data buffers 123, 124 see. This gives the memory devices 1–8 100 picoseconds more set-up time.

Figure 6:
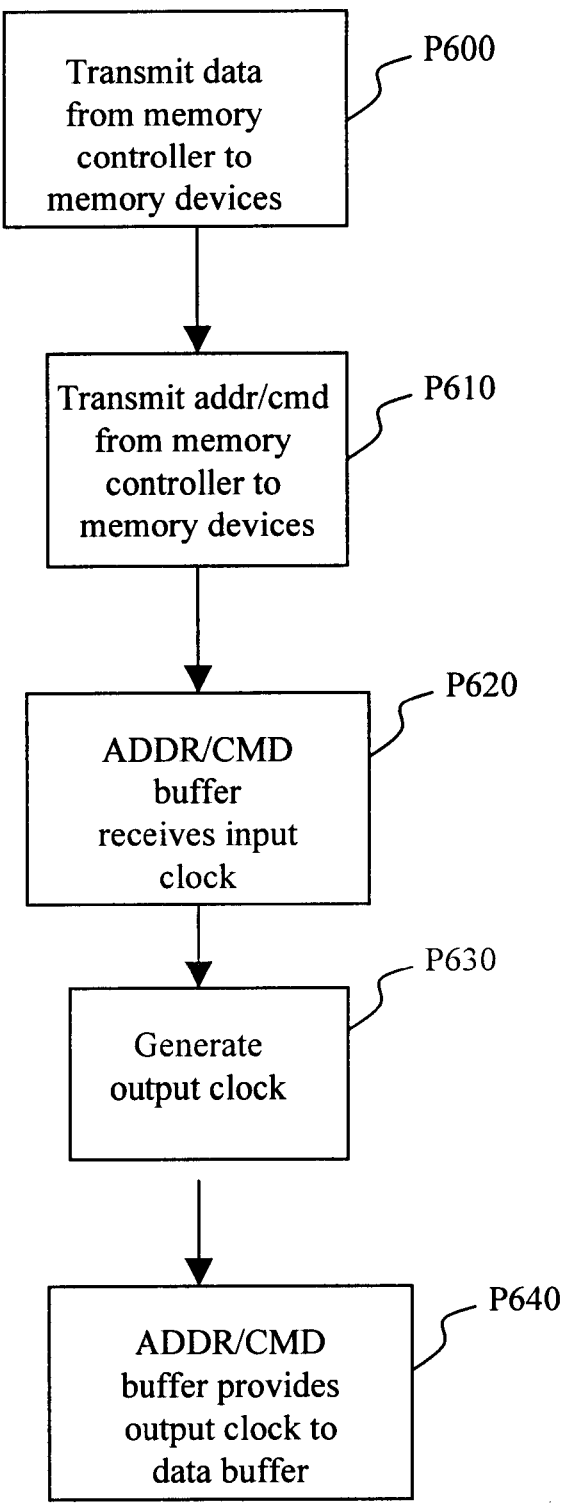
FIG. 6 illustrates processes for operating a memory system according to an embodiment of the present invention.

FIG. 6 illustrates processes for operating a memory system according to an embodiment of the present invention. The memory system includes a memory controller, a data buffer, an ADDR/CMD buffer, an embedded clock circuit, and memory devices. In block P600, data is transmitted from the memory controller to the memory devices via the data buffer. In other embodiments, data is transmitted from the memory devices to the memory controller via the data buffer. In block P610, address information and command information are transmitted from the memory controller to the memory device via the ADDR/CMD buffer. In block P620, the ADDR/CMD buffer receives an input clock. Based on the input clock, the ADDR/CMD buffer generates an output clock in block P630. In block P640, the ADDR/CMD buffer provides the output clock to the data buffer as an input clock for the data buffer. In other embodiments of the invention, the above process is extended to include the ADDR/CMD buffer further providing the output clock to the memory device.

The invention is based on the use of high-speed, low-cost buffers to isolate memory devices from a memory controller. Embodiments of the invention and method as set forth above allow data and command/address clocking to be performed using a clock circuit imbedded in the buffers, preferably in address and command buffers. This clocking scheme lets data and command/address to be transmitted across the buffers reliably. The advantage of such clocking scheme is the ability to accurately control clock-skew to the data buffers and/or the memory devices. This, in turn provides the ability to operate the memory system at a high frequency. Besides improving the clocking accuracy and maintaining the clocking integrity, additional costs and module space are also saved by embedding the clock circuit in the address and command buffer 122. A PLL or DLL that satisfies the requirements of the system is incorporated in the embedded clock circuit. No external PLL or DLL is required to drive clocks to the memory devices.

While the description above refers to particular embodiments of the present invention, it will be understood that many modifications may be made without departing from the spirit thereof. For example, the clock circuit 300 may be placed in the data buffers and operated independently. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A memory system, comprising:

at least one memory device to store data;

a memory controller, to control the at least one memory device, that sends data, address information, and command information to the at least one memory device, and receives data from the at least one memory device;

at least one data buffer, located externally from the at least one memory device and the memory controller, interconnecting the at least one memory device and the memory controller;

an address and command buffer (addr/cmd buffer), located externally from the at least one memory device and the memory controller, interconnecting the at least one memory device and the memory controller; and a clock circuit embedded in the addr/cmd buffer, wherein the clock circuit takes an input clock and outputs an output clock to the at least one data buffer to control clock-skew to the at least one data buffer.

2. The memory system of claim 1, wherein the clock circuit embedded includes a delay locked loop (DLL).

3. The memory system of claim 1, wherein the clock circuit embedded includes a phase locked loop (PLL).

4. The memory system of claim 1, wherein the clock circuit embedded includes a delay chain.

5. The memory system of claim 1, wherein the at least one memory device is a dynamic random access memory.

6. The memory system of claim 1, wherein the at least one memory device and the buffer are housed within a memory module.

7. The memory system of claim 1, wherein the buffer resides on a motherboard of a computer system and the at least one memory device is housed within a memory module.

8. A buffering device interconnecting a memory controller and a memory device, comprising:

at least one data buffer located externally from the memory device and the memory controller, wherein the memory controller controls the memory device;

an address and command buffer (addr/cmd buffer) located externally from the memory device and the memory controller to facilitate transfer of command information and address information from the memory controller to the memory device; and a clock circuit embedded in the addr/cmd buffer, wherein the clock circuit takes an input clock and provides an output clock to the at least one data buffer to control clock-skew to the at least one data buffer.

9. The buffering device of claim 8, wherein the clock circuit also provides the output clock to the memory device to control clock-skew to the memory device.

10. The buffering device of claim 8, further comprising a clock driver for driving the output clock to the at least one data buffer.

11. The buffering device of claim 8, wherein the clock circuit includes a delay locked loop (DLL).

12. The memory system of claim 8, wherein the clock circuit includes a phase locked loop (PLL).

13. The memory system of claim 8 wherein the clock circuit includes a delay chain.

14. A method of operating a memory system including a memory controller, a memory device, a data buffer, and an address and command buffer (addr/cmd buffer), the method comprising:

transmitting data from the memory controller to the memory device via the data buffer, or from the memory device to the memory controller via the data buffer, wherein the data buffer is located externally from the memory device and the memory controller, and the memory controller controls the memory device;

transmitting address information and command information from the memory controller to the memory device via the addr/cmd buffer, wherein the addr/cmd buffer is located externally from the memory device and the memory controller;

receiving an input clock by a clock circuit embedded in the addr/cmd buffer;

generating a first output clock by the clock circuit embedded in the addr/cmd buffer based on the input clock; and providing the first output clock from the clock circuit embedded in the addr/cmd buffer to the data buffer.

15. The method of claim 14, the method further comprising generating a second output clock in the addr/cmd buffer based on the input clock;

outputting the output clock from the addr/cmd buffer to the memory device.

16. The method of claim 15, wherein the first output clock and the second output clock are identical in frequency and phase.

17. The method of claim 14, wherein the first output clock is generated by a delay locked loop (DLL) embedded in one of the at least one data buffer and the addr/cmd buffer.

18. The method of claim 14, wherein the first output clock is generated by a phase locked loop (PLL) embedded in one of the at least one data buffer and the addr/cmd buffer.

19. The method of claim 14, wherein the first output clock is generated by a delay chain embedded in one of the at least one data buffer and the addr/cmd buffer.

* * * * *